United States Patent [19]

Lysenko et al.

[11] Patent Number: 5,142,021
[45] Date of Patent: Aug. 25, 1992

[54] USE OF REDUCING AGENTS IN POLYBENZAZOLE SYNTHESIS

[75] Inventors: Zenon Lysenko; Steven Rosenberg; William J. Harris, all of Midland, Mich.

[73] Assignee: The Dow Chemical Company, Midland, Mich.

[21] Appl. No.: 600,550

[22] Filed: Oct. 19, 1990

[51] Int. Cl.5 .............................................. C08G 69/26
[52] U.S. Cl. ..................................... 528/348; 528/184
[58] Field of Search ................................. 528/184, 348

[56] References Cited

U.S. PATENT DOCUMENTS

| 3,864,310 | 2/1975 | Saferstein | 528/180 |
| 3,901,883 | 8/1975 | Liechti et al. | 548/217 |
| 4,578,435 | 3/1986 | Tsai et al. | 528/348 |
| 4,772,678 | 9/1988 | Sybert et al. | 528/179 |
| 4,954,501 | 9/1990 | Herter et al. | 514/252 |
| 4,978,790 | 12/1990 | Lau et al. | 364/315 |

OTHER PUBLICATIONS

11 Encyclopedia of Polymer Sci. & Eng. Polybenzothiazoles and Polybenzoxazoles, 601 (J. Wiley & Sons 1988).
Ledbetter et al., "An Integrated Laboratory Process for Preparing Rigid Rod Fibers from the Monomers," The Materials Science and Engineering of Rigid rod Polymers, 253 (Materials Research Society 1989).

Primary Examiner—John Kight, III
Assistant Examiner—T. Mosley

[57] ABSTRACT

Polybenzazole polymers are conveniently synthesized in the presence of a reducing agent, such as tin (II) chloride.

16 Claims, No Drawings

USE OF REDUCING AGENTS IN POLYBENZAZOLE SYNTHESIS

BACKGROUND OF THE INVENTION

This invention relates to the art of polybenzazole (PBZ) polymers and processes for synthesizing them.

Polybenzazole polymers are a known class of polymers comprising polybenzoxazole (PBO), polybenzothiazole (PBT), polybenzimidazole (PBI) and copolymers of these polymers. Polybenzazoles are generally classified as AB-polymers, containing a plurality of mer units depicted in formula 1(a), or AA/BB, containing a plurality of mer units which conform with formula 1(b)

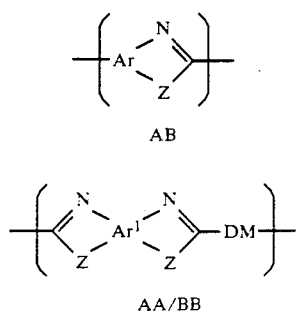

wherein:
each Ar is an aromatic group,
DM is a divalent organic moiety which is stable and inert in acid under polymerization conditions, and
each Z is independently an oxygen atom, a sulfur atom, or a nitrogen atom that is bonded to a hydrogen atom or an organic moiety which is stable and inert in acid under polymerization conditions.

(For the purpose of this application, when the nitrogen atoms and Z moieties of a mer unit are depicted as bonded to an aromatic group without indicating their position, as in Formulae 1(a)–(b), it shall be understood that:
(1) each nitrogen atom and Z group within a given azole ring are bonded to the aromatic group in ortho position with respect to each other; and
(2) if the mer unit has two azole rings, one nitrogen atom and Z moiety may be in either cis position or trans position with respect to the other nitrogen atom and Z moiety, for example illustrated in 11 Ency. Poly. Sci. & Eng., supra, at 602, which is incorporated herein by reference. The same understandings apply with respect to amine groups and Z moieties in a BB-PBZ monomer.)

Polybenzazoles are synthesized by the reaction of one or more difunctional monomers, each of which contains at least two azole-forming moieties chosen from the group consisting of electron-deficient carbon groups and o-amino-basic moieties. Such reactions are illustrated in Formulae 2(a) and (b).

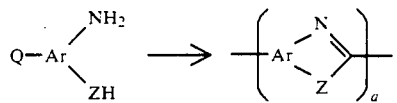

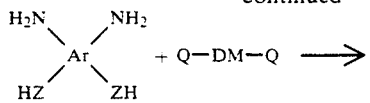

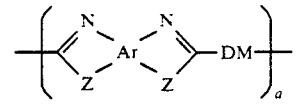

wherein each Q is an electron-deficient carbon group and all other moieties have the meaning and preferred embodiments previously given. The monomer shown in Formula 2(a) is ordinarily referred to as an AB-monomer, and the monomers in FIG. 2(b) are ordinarily called BB- and AA-monomers. The divalent organic moiety DM of the AA-monomer ordinarily comprises an aromatic group, which is most usually a p-phenylene group. The reaction is ordinarily carried out under non-oxidizing conditions in a non-oxidizing, dehydrating solvent acid, which is most frequently polyphosphoric acid.

Polybenzazole polymers, their properties and their synthesis are discussed in detail in the following references: Sybert et al., *Liquid Crystalline Polymer Compositions, Process and Products*, U.S. Pat. No. 4,772,678 (Sep. 20, 1988); Wolfe et al., *Liquid Crystalline Polymer Compositions, Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985); Imai et al. "Polybenzoxazoles and Polybenzothiazoles," 83 Makromol. Chem. 167 (1965), Evers, *Thermooxidatively Stable Articulated p-Benzobisoxazole and p-Benzobisthiazole Polymers*, U.S. Pat. No. 4,359,567 (Nov. 16, 1982); Tsai et al., *Method for Making Heterocyclic Block Copolymer*, U.S. Pat. No. 4,578,432 (Mar. 25, 1986) and 11 Ency. Poly. Sci. & Eng., *Polybenzothiazoles and Polybenzoxazoles*, 601 (J. Wiley & Sons 1988), which are incorporated herein by reference.

The o-amino-basic groups in AB- and BB-PBZ monomers are susceptible to oxidation. This is particularly true for BB-PBZ monomers of PBO and PBT. The oxidation problem can be partially avoided by storing the monomers as hydrogen chloride salts, but even acid salts experience some oxidation over time. Furthermore, the monomer can become oxidized by thermal degradation during polymerization at too high a temperature.

Oxidation may upset stoichiometry in polymerization and hold down the molecular weight of the resulting polymer. It may also cause the resulting polymer to have an undesirably dark color. It is desirable to minimize the effects of oxidized AB- and BB-PBZ monomers on polymerization.

SUMMARY OF THE INVENTION

One aspect of the present invention is a process for synthesizing a polybenzazole polymer comprising the step of reacting AB-PBZ monomer and/or a mixture of AA- and BB-PBZ monomers in a non-oxidizing dehydrating medium under conditions suitable to form polybenzazole polymer, in the presence of a reducing agent that does not interfere with the polymerization and can reduce an oxidized monomer species to a state suitable for polymerization, said reducing agent being present in a quantity of at least 0.5 weight percent of the quantity of AB-PBZ monomers and BB-PBZ monomers.

A second aspect of the present invention is a shaped article comprising a major amount of polybenzazole polymer and a minor amount of a tin-containing compound.

The monomer composition and the process of the present invention can be used to synthesize dopes containing polybenzazole polymer. The dopes can be spun or extruded and coagulated to form shaped articles such as fibers and films which can be used in composites and laminates for the same purposes as other polybenzazole articles.

DETAILED DESCRIPTION OF THE INVENTION

Definitions

The following terms are used repeatedly throughout this application, and have the meaning and preferred embodiments defined herein unless otherwise specified.

AA-PBZ monomer—A monomer suitable for synthesizing polybenzazole polymers, comprising two electron-deficient carbon groups linked by a divalent organic moiety (DM) which is inert with respect to all reagents under polybenzazole polymerization conditions. The electron-deficient carbon groups have the definition and preferred embodiments given herein. The divalent organic moiety is preferably alkyl or an aromatic group, as herein defined, is more preferably an aromatic group, and is most preferably a six-membered aromatic group. Examples of suitable AA-PBZ monomers and references to their synthesis are provided in U.S. Pat. No. 4,533,693 at Col. 25-32, Tables 4-6, which is incorporated herein by reference. Preferred examples of AA-PBZ monomers include terephthalic acid, isophthalic acid, bis-(4-benzoic acid) and oxy-bis-(4-benzoic acid) and acid halides thereof.

AB-Monomer—A monomer suitable for synthesizing polybenzazole polymers, comprising an aromatic group, an o-amino-basic moiety bonded to the aromatic group, and an electron-deficient carbon group bonded to the aromatic group. The aromatic group, the electron-deficient carbon group and the o-amino-basic moiety have the definitions and preferred embodiments given herein. Examples of suitable AB-monomers and processes for their synthesis are provided in U.S. Pat. No. 4,533,693 at Col. 33-35, Tables 7-8, which is incorporated herein by reference. Preferred examples of AB-monomers include 3-amino-4-hydroxybenzoic acid, 3-hydroxy-4-aminobenzoic acid, 3-amino-4-thiobenzoic acid, 3-thio-4-aminobenzoic acid and the acid halides thereof. AB-monomers are frequently stored as salts of hydrogen chloride or phosphoric acid, because the free-base of the monomer is susceptible to air oxidation. Examples of synthesis for AB-monomers are shown in U.S. Pat. Nos. 4,764,263; 4,835,306 and 4,533,692 at Tables 7 & 8, Col. 30-32.

o-Amino-basic moiety—a moiety, which is bonded to an aromatic group, consisting of
(1) a primary amine group bonded to the aromatic group and
(2) a hydroxy, thiol or primary or secondary amine group bonded to the aromatic group ortho to said primary amine group.

It preferably comprises a hydroxy, thiol or primary amine moiety, more preferably comprises a hydroxy or thiol moiety, and most preferably comprises a hydroxy moiety. Secondary amine groups comprise an aromatic or an aliphatic group and preferably an alkyl group. The secondary amine group preferably comprises no more than about 6 carbon atoms, more preferably no more than about 4 carbon atoms and most preferably no more than about 1 carbon atom.

Aromatic group (Ar)—any aromatic ring or ring system. Size is not critical as long as the aromatic group is not so big that it prevents further reactions of the moiety in which it is incorporated. Each aromatic group independently preferably comprises no more than about 18 carbon atoms, more preferably no more than about 12 carbon atoms and most preferably no more than about 6 carbon atoms. Each may be heterocyclic but is preferably carboxyclic and more preferably hydrocarbyl. If the aromatic group is heterocyclic, the heteroatom is preferably nitrogen.

Unless otherwise specified, each aromatic group may comprise a single aromatic ring, a fused ring system or an unfused ring system containing two or more aromatic moieties joined by bonds or by divalent moieties (DM) which are inert with respect to PBZ polymerizing reagents under polymerization conditions. Suitable divalent moieties comprise, for example, a carbonyl group, a sulfonyl group, an oxygen atom, a sulfur atom, an alkyl group and/or and or a perfluorinated alkyl group. Each aromatic group is preferably a single six-membered ring.

Each aromatic group may contain substituents which do not interfere with the synthesis, fabrication and use of the polybenzazole polymer. Examples of preferred substituents include halogens, alkoxy moieties, aryloxy moieties or alkyl groups. More preferred substituents are either an alkyl group having no more than about 6 carbon atoms or a halogen. Most preferably, each aromatic group contains only those substituents specifically called for hereinafter.

Azole ring—an oxazole, thiazole or imidazole ring. The carbon atom bonded to both the nitrogen atom and the oxygen, sulfur or second nitrogen atom is the 2-carbon, as depicted in Formula 3:

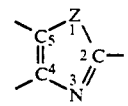

3 wherein Z is —O—, —S— or —NR—; and R is hydrogen, an aromatic or an aliphatic group, preferably hydrogen or an alkyl group, and most preferably hydrogen. R preferably comprises no more than about 6 carbon atoms, more preferably no more than about 4 and most preferably no more than about 1. Each azole ring is independently preferably oxazole or thiazole and more preferably oxazole. In polybenzazole polymers, the 4- and 5-carbon of each azole ring is ordinarily fused with an aromatic group.

Azole-forming moiety—an "o-amino-basic moiety" or "electron-deficient carbon group," as those terms are defined herein.

BB-PBZ monomer—A monomer suitable for synthesizing polybenzazole polymers, comprising an aromatic group and two o-amino-basic moieties which are bonded to the aromatic group. The aromatic group and the o-amino-basic moieties have the definitions and preferred embodiments given herein. Examples of suitable BB-PBZ monomers and processes for synthesis are provided in U.S. Pat. No. 4,533,693 at Col. 19-24, Tables 1-3, which is incorporated herein by reference. Examples of preferred BB-PBZ monomers include 4,6-diaminoresorcinol, 2,5-diaminohydroquinone and 1,4-dithio-2,5-diaminobenzene. BB-PBZ monomers are stored as salts of hydrogen chloride or phosphoric acid, because the free base of the monomer is susceptible to air oxidation. Examples of the synthesis of BB-PBZ monomers are described in U.S. Pat. Nos. 4,766,244; 4,806,688; and 4,533,692 at Tables 1-3, Col. 17-22.

Electron-deficient carbon group (Q)—any group containing a carbon atom which can react in the solvent acid with an o-amino-basic moiety to form an azole ring, such as the groups listed in Col. 24, lines 59-66 of the U.S. Pat. No. 4,533,693, which is incorporated herein by reference. Preferred electron-deficient carbon groups are carboxylic acids, acid halides, metal carboxylate salts, cyano groups and trihalomethyl groups. Halogens in electron-deficient carbon groups are preferably chlorine, bromine or iodine and more preferably chlorine.

Polybenzazole (PBZ) polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each mer unit contains an oxazole ring bonded to an aromatic group, which need not necessarily be a benzene ring. The term "polybenzoxazole (PBO)" also refers broadly to poly(phenylene-benzobis-oxazole)s and other polymers wherein each mer unit comprises a plurality of oxazole rings fused to an aromatic group. The same understandings shall apply to the terms polybenzothiazole (PBT) and polybenzimidazole (PBI).

Rigid Rod PBZ polymer—An "intrinsic" or "articulated" rigid rod PBZ polymer as the terms "intrinsic" and "articulated" are defined in the Hwang, "Processing, Structure and Properties of Liquid Crystalline PBT Polymer", Kansai Committee of the Society of Fiber Science and Technology, Japan, Post Symposium on Formation, Structure and Properties of HIgh Modulus and High Tenacity Fibers 23-26 (Aug. 26, 1985); Evers et al, "Articulated All-Para Polymers with 2,6-Benzobisoxazole, 2,6-Benzobisthiazole, and 2,6-Benzobisimidazole Units in the Backbone," 14 Macromolecules 925 (1981); Evers, "Thermoxidatively Stable Articulated Benzobisoxazole and Benzobisthiazole Polymers," 24 J. Poly. Sci. Part A 1863 (1986) and Evers et al., *Articulated Para-Ordered Aromatic Heterocyclic Polymers Containing Diphenoxybenzene Structures*, U.S. Pat. No. 4,229,566 (Oct. 21, 1980).

Intrinsic rigid rod polymers are substantially rectilinear and typically consist essentially of mer units having an angle of catenation of at least about 150°. Articulated rigid rod polymers comprise a plurality of essentially rectilinear moieties joined by a relatively small number of non-linear moieties. Rigid rod PBZ polymers used in the present invention are preferably intrinsic rigid rod polymers. If articulated, they preferably comprise on average no more than about 1 non-linear mer unit for each 9 essentially rectilinear mer units.

Solvent acid—any non-oxidizing liquid acid capable of dissolving PBZ polymers, such as sulfuric acid, methanesulfonic acid, trifluoromethylsulfonic acid, polyphosphoric acid and mixtures thereof. It must be sufficiently non-oxidizing that it does not substantially oxidize AB- and BB-PBZ monomers which are dissolved therein. Solvent acids are preferably dehydrating acids, such as polyphosphoric acid or a mixture of methanesulfonic acid and phosphorus pentoxide. Preferred concentrations of $P_2O_5$ in the methanesulfonic acid are described in U.S. Pat. Nos. 4,847,350 and 4,722,678, which are incorporated by reference. Concentrations of $P_2O_5$ in the polyphosphoric acids are described in U.S. Pat. Nos. 4,533,693 and 4,722,678, which are incorporated by reference.

DESCRIPTION OF THE INVENTION

The present invention uses AB-PBZ monomers and/or AA- and BB-PBZ monomers. Each of those monomers conforms to the broad description previously given. The AB- and/or BB-PBZ monomers are preferably suitable to form PBO or PBT (each Z is either —O— or —S—) and more preferably suitable to form PBO.

It is convenient to think of the synthesis of polybenzazole polymers as occurring in four stages. In the first (mixing) stage, at least the AB-PBZ and/or BB-PBZ monomers are mixed with a solvent. AA-PBZ monomers are preferably added during the mixing stage, but may be added during the later stages if they contain no halogens (such as terephthalic acid). In the second (devolatilization) stage, volatile protecting acids are drawn off from the reaction mixture, if necessary. In the third (oligomerization) stage, the monomers react to form oligomers. In the fourth (advancement) stage, the oligomers react to form high molecular weight polymer.

There is no sharp dividing line for these stages. Devolatilization may commence as the monomers are mixed with the solvent. The devolatilization and oligomerization stages may be carried out simultaneously in the same piece of equipment. There is not a generally recognized point at which a polymer is at too high a molecular weight for the oligomerization stage or too low a molecular weight for the advancement stage. Oligomerization and advancement may be carried out in a single reactor as a single continuous reaction.

Certain reaction conditions are equally applicable in all stages. The reaction is carried out in a non-oxidizing, dehydrating medium, which is ordinarily a solvent acid and is preferably polyphosphoric acid. The conditions should be non-oxidizing, such as nitrogen or noble gas atmosphere or vacuum. The pressure may be atmospheric, subatmospheric or superatmospheric, but should permit the removal of volatile compounds that interfere with polymerization.

The reaction mixture is preferably vigorously agitated throughout the entire reaction. The reaction mixture may be difficult to agitate due to high viscosity at the beginning of the reaction when the temperature is low and at the end of the reaction when the degree of polymerization in the polymer is very high. Suitable agitation may be provided by a number of suitable devices, such as those described in U.S. Pat. No. 4,772,678 at Col. 44-45, which is incorporated herein by reference. Examples of suitable equipment includes impellers, press-mixers and single- and twin-screw extruders.

The mixing stage is preferably carried out at a temperature of at least about 25° C., more preferably at least about 45° C. and most preferably at least about 55° C. It should be low enough that the monomer does not substantially degrade. It is preferably no more than about 150° C., more preferably no more than about 100° C. and most preferably no more than about 70° C.

The concentration of monomers added during mixing is preferably high enough that the dope resulting from polymerization is spinnable and, for rigid rod or semi-rigid rod polymers, is anisotropic. The concentration of monomer may be low, such as about 1-2 percent or less. It is preferably enough to yield a dope containing at least about 7 percent polymer by weight, more preferably at least about 10 percent and most preferably at least about 13 percent. The maximum concentration is governed primarily by practical considerations, such as solubility of monomer and polymer, and the viscosity of the reaction mixture during and after polymerization. The concentration of monomer is ordinarily enough to yield a dope containing no more than about 30 percent polymer by weight, and more usually no more than about 18 percent.

When the reaction medium is a polyphosphoric acid having a low $P_2O_5$ content (such as 77 weight percent) then additional $P_2O_5$ is preferably added during the mixing step, to yield a polyphosphoric acid appropriate for devolatilization and/or oligomerization.

The devolatilization stage may be unnecessary, if the monomers chosen do not liberate volatile by-products. For instance, 4,6-diaminoresorcinol diphosphate and terephthalic acid can be polymerized without devolatilization, as described in Harris et al., Ser. No. 341,502 (filed Apr. 21, 1989), which is incorporated herein by reference. On the other hand, the reaction mixture should be devolatilized if the monomers liberate volatile byproducts. For instance, 4,6-diaminoresorcinol bis(hydrogen chloride) and terephthaloyl chloride typically require devolatilization.

The temperature of the devolatilization stage is preferably no more than about 190° C., more preferably no more than about 150° C., and most preferably no more than about 130° C. It is preferably at least about 40° C., more preferably at least about 60° C., and most preferably at least about 100° C. If the reaction medium is polyphosphoric acid, then it may contain low concentrations of $P_2O_5$, such as 77 weight percent or less, but is preferably contains higher concentrations, such as at least about 80 weight percent $P_2O_5$, more preferably at least about 85 weight percent, and most preferably at least about 88 weight percent. The level of $P_2O_5$ in the polyphosphoric acid is preferably no more than about 92 weight percent.

The temperature of the oligomerization stage is preferably at least about 60° C., more preferably at least about 100° C. and more preferably at least about 120° C. It is preferably no more than about 190° C., more preferably no more than about 170° C., and most preferably no more than about 150° C. The reducing agents used in the present invention facilitate the synthesis of higher molecular weight polymer in reactions in which mixing, devolatilization and/or oligomerization stages are carried out at temperatures in excess of 150° C. If the reaction medium is polyphosphoric acid, then it preferably contains high concentrations of $P_2O_5$ as previously described. If the reaction medium contains BB-PBZ monomers, then it should also contain AA-PBZ monomers, although one of the monomers may be in a slight molar excess (preferably no more than about 15 percent).

The temperature of the advancement stage is preferably at least about 175° C. and more preferably at least about 190° C. It is preferably at most about 300° C., more preferably at most about 230° C., and most preferably at most about 220° C. The reaction medium should be sufficiently dehydrating to react with water generated during the advancement. If the reaction mixture contained an excess of BB-PBZ monomer during oligomerization, then AA-PBZ monomer is preferably added during advancement to balance the reaction stoichiometry.

At least one stage of the reaction is carried out in the presence of a reducing agent which does not interfere with the polymerization and which can reduce at least one oxidized monomer species back to the desired monomer. The reducing agent is preferably a tin (II) halide and more preferably tin (II) chloride or a hydrate thereof. The reducing agent is theorized to convert oxidized o-amino-basic moieties in the monomer back to reactive, unoxidized moieties, which can participate in linking of monomers.

Without intending to be bound thereby, it is theorized that oxygen oxidizes certain monomers in several steps. For instance, the theorized first oxidation product of 4,6-diaminoresorcinol is represented by Formula 5:

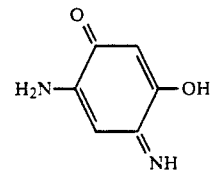

It is further theorized that the first oxidation products are more easily reduced to monomer than subsequent oxidation products. Therefore, it is important that the first oxidized structure be reduced back to the o-amino-basic moiety before it oxidizes further.

The amount of reducing agent should be sufficient to reduce oxidized impurities in the monomer. The concentration of tin (II) chloride is preferably no more than 10 weight percent of the weight of the AB- and/or BB-PBZ monomer, more preferably no more than 5 weight percent, and most preferably no more than 3 weight percent. It is preferably at least about 0.5 weight percent, more preferably at least about 1 weight percent and most preferably at least about 2 weight percent.

The reducing agent should be added to the reaction mixture at an early enough stage for it to be effective. It is preferably added to the reaction mixture no later than the mixing stage. The reducing agent is more preferably mixed with the AB- or BB-PBZ monomer before it is dissolved in the solvent acid.

Most preferably, the AB- or BB-PBZ monomer is stored for use in a monomer composition with the solid reducing agent. For instance, the monomer may be precipitated from a solution containing the reducing agent under conditions such that at least some reducing agent remains on or in the monomer particles after they are dried. Such compositions are more stable with regard to air oxidation than ordinary precipitated monomer salts. The concentration of reducing agent in the monomer is preferably at least about 100 ppm and more preferably at least about 500 ppm. The maximum concentration of reducing agent may be as high as is permitted in the reaction mixture, but is preferably no more than about 2600 ppm, and more preferably no more than about 1000 ppm. Additional reducing agent may be added during the polymerization as needed to reach the desired concentration of reducing agent.

The coagulated polymer produced by processes of the present invention typically contains traces of reducing agent and oxidized reducing agent. For instance, polymer synthesized using a tin (II) chloride reducing agent may contain trace amounts of tin (II) and tin (IV). Those traces are preferably minimized. The concentration of residual reducing agent is preferably no more than about 0.1 weight percent, and more preferably no more than about 0.01 weight percent.

The process and/or monomer compositions of the present invention can be used to make dopes containing polybenzazole polymer and residual reducing agent. The polymer can be coagulated from the dope into fibers and films by known spin-draw techniques and extrusion techniques, such as those described in U.S. Pat. No. 4,772,678 at Col. 89-91; U.S. Pat. No. 4,263,245; 11 Ency. Poly. Sci. & Eng., supra, at 625-28; U.S. Pat. No. 4,533,693 at Col. 82-84; Hwang et al., "Solution Processing and Properties of Molecular Composite Fibers and Films," 23 Poly. Eng. & Sci. 784, 785 (1984); and Hwang et al., "Composites on a Molecular Level: Phase Relationships, Processing, and Properties," (B22(2) J. Macromol. Sci.-Phys. 231, 234-35 (1983), which are incorporated by reference. Fibers can be used in matrix composites as described in 11 Ency. Poly. Sci. & Eng., supra, at 625-30, which is incorporated herein by reference. Films can be used as dielectric films for capacitors, as drum winding for cryogenic tanks, in membrane applications or as cable wrapping. Laminates can be used as structural materials.

ILLUSTRATIVE EXAMPLES

The following examples are for illustrative purposes only, and should not be taken as limiting the scope of either the specification or the claims. All parts and percentages are by weight unless otherwise stated.

EXAMPLE 1

Synthesis of cis-PBO using tin (II) chloride and aged monomer

A sample of 4,6-diaminoresorcinol bis-(hydrochloride) is purified to a white crystal and stored for 2½ weeks, at which time it shows a pale pink color. A mixture containing 10 g of the monomer, 7.79 g of terephthalic acid, 47.3 g of polyphosphoric acid containing 83.6 weight percent $P_2O_5$, 16.9 g of $P_2O_5$, and 0.21 g of tin (II) chloride dihydrate is reacted under nitrogen atmosphere with vigorous agitation for 4 hours at 90° C., 1 hour from 90° C. to 150° C., 4 hours at 150° C., 1 hour at 150° C. to 190° C. and 12 hours at 190° C. The same experiment is simultaneously repeated using identical quantities of each reagent except for no tin (II) chloride.

The dope containing tin (II) chloride is observed to have a yellow color and pull a strong fiber, whereas the dope without tin (II) chloride is observed to have a purple-green color and pull a weak fiber. Each polymer is coagulated with water, washed to remove essentially all polyphosphoric acid and redissolved in methanesulfonic acid at a concentration of about 0.05 g/dL. The sample with tin (II) chloride has an inherent viscosity of about 25 dL/g, whereas the sample without tin (II) chloride has an inherent viscosity of about 17 dL/g at 25° C.

EXAMPLE 2

Synthesis of cis-PBO using tin (II) chloride in thermally degraded monomer

A mixture containing 10 g of 4,6—diaminoresorcinol bis-(hydrochloride), 7.79 g of terephthalic acid, 47.3 g of polyphosphoric acid containing 83.6 weight percent $P_2O_5$, 16.9 g of $P_2O_5$, and 0.21 g of tin (II) chloride dihydrate is reacted under nitrogen atmosphere with vigorous agitation for 4 hours at 150° C., 1 hour at 150° C. to 190° C. and 12 hours at 190° C. The same experiment is simultaneously repeated using identical quantities of each reagent except for no tin (II) chloride.

The dope containing tin (II) chloride is observed to have a yellow color and pull a strong fiber, whereas the dope without tin (II) chloride is observed to have a purple-green color and pull a weak fiber. Each polymer is coagulated with water, washed to remove essentially all polyphosphoric acid and redissolved in methanesulfonic acid at a concentration of about 0.05 g/dL. The sample with tin (II) chloride has an inherent viscosity of about 27 dL/g, whereas the sample without tin (II) chloride has an inherent viscosity of about 18 dL/g at 25° C.

We claim:

1. A process for synthesizing a polybenzazole polymer comprising the step of reacting AB-PBZ monomer and/or a mixture of AA- and BB-PBZ monomers in a non-oxidizing dehydrating solvent acid solution that contains polyphosphoric acid and/or methanesulfonic acid under conditions suitable to form polybenzazole polymer, in the presence of a reducing agent that does not interfere with the polymerization and can reduce an oxidized monomer species to a state suitable for polymerization, said reducing agent being present in a quantity of at least 0.5 weight percent of the quantity of AB-PBZ monomers and BB-PBZ monomers.

2. The process of claim 1 wherein the monomers are suitable to produce a polybenzoxazole or polybenzothiazole polymer.

3. The process of claim 2 wherein the reducing agent is a tin (II) halide.

4. The process of claim 3 wherein the reducing agent in tin (II) chloride or a hydrate thereof.

5. The process of claim 3 wherein the concentration of reducing agent is no more than about about 10 weight percent of the concentration of AB- and/or BB-monomer.

6. The process of claim 3 wherein the monomers are AB-PBZ monomers selected from the group consisting of 3-amino-4-hydroxybenzoic acid, 4-amino-3-hydroxybenzoic acid, 3-amino-4-thiobenzoic acid, 4-amino-3-thiobenzoic acid and the acid salts and/or acid halides thereof.

7. The process of claim 3 wherein the monomers are at least one AA-PBZ monomer and at least one BB-PBZ monomer selected from the groups consisting of 4,6-diaminoresorcinol, 2,5-diaminohydroquinone or 2,5-diamino-1,4-dithiobenzene and acid salts thereof.

8. The process of claim 7 wherein the AA-monomer is terephthalic acid, bis-(4-benzoic acid) or an acid halide thereof.

9. The process of claim 3 wherein the quantity of reducing agent is at least about 1 weight percent of the quantity of AB-PBZ monomer and BB-PBZ monomer.

10. The process of claim 3 wherein the quantity of reducing agent is at least about 2 weight percent of the quantity of AB-PBZ monomer and BB-PBZ monomer.

11. The process of claim 3 wherein the quantity of reducing agent is no more than about 5 weight percent of the quantity of AB-PBZ monomer and BB-PBZ monomer.

12. The process of claim 3 wherein the quantity of reducing agent is no more than about 3 weight percent of the quantity of AB-PBZ monomer and BB-PBZ monomer.

13. A shaped article comprising (a) a rigid rod polybenzoxazole or polybenzothiazole polymer and (b) between 0.1 weight percent and 100 ppm tin salts.

14. The shaped article of claim 13 which comprises no more than about 0.01 weight percent tin salts.

15. The shape article of claim 13 wherein the polybenzoxazole or polybenzothiazole polymer is a rigid rod polymer.

16. The shaped article of claim 15 wherein the shaped article is a fiber.

* * * * *